United States Patent
Naruse

(10) Patent No.: US 6,564,461 B1
(45) Date of Patent: May 20, 2003

(54) WHEEL ALIGNMENT ADJUSTING DEVICE

(75) Inventor: Yutaka Naruse, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/610,997

(22) Filed: Jul. 6, 2000

(30) Foreign Application Priority Data

Jul. 6, 1999 (JP) .......................................... 11-191651

(51) Int. Cl.[7] .............................. G01B 5/24; B26D 17/00
(52) U.S. Cl. ................... 33/203; 33/203.13; 33/203.12; 33/203.15
(58) Field of Search ............................ 33/203, 203.12, 33/203.13, 203.14, 203.15, 203.16, 549, 568, 573

(56) References Cited

U.S. PATENT DOCUMENTS

| | | | |
|---|---|---|---|
| 4,588,048 A | | 5/1986 | Rodriguez .................. 187/213 |
| 5,088,320 A | * | 2/1992 | Fukuda et al. ............ 33/203.13 |
| 5,313,710 A | * | 5/1994 | Wakamori et al. ......... 3/203.13 |
| 5,844,145 A | | 12/1998 | D'Angelo ................ 73/862.18 |

FOREIGN PATENT DOCUMENTS

| | | |
|---|---|---|
| DE | 32 10 318 A | 9/1983 |
| FR | 2 711 635 A | 5/1995 |

* cited by examiner

*Primary Examiner*—Randy Gibson
(74) *Attorney, Agent, or Firm*—Sughrue Mion, PLLC

(57) ABSTRACT

A wheel alignment adjusting device is provided in which loading portions, on which wheels of a vehicle are loaded, can be positioned with high accuracy. Front and rear tire driving devices 118 at a vehicle transverse direction left side are fixed to a loading stand 18. Front and rear tire driving devices 118 at a vehicle transverse direction right side are mounted to a first sliding base 34R. The first sliding base 34R is movable in a vehicle transverse direction with respect to the loading stand 18. When a vehicle transverse direction distance between the tire driving devices 118 is to be changed in accordance with a tread base of the vehicle, the first sliding base 34R is moved. Only the tire driving devices 118 at one vehicle transverse direction side are moved, rather than the tire driving devices 118 at both vehicle transverse direction sides. Thus, a structure of the wheel alignment adjusting device is simplified because a number of driving devices for moving the tire driving devices 118 is reduced. Further, when the tire driving devices 118 are moved, highly accurate positioning is possible.

5 Claims, 16 Drawing Sheets

WHEEL ALIGNMENT ADJUSTING DEVICE

BACKGROUND OF THE INVENTION

1. Field of the Invention

The present invention relates to a wheel alignment adjusting device for adjusting alignment of wheels of a vehicle.

2. Description of the Related Art

Generally, wheels of a vehicle are provided with a camber angle for ensuring traveling stability of the vehicle, and are provided with a toe angle for preventing irregular wear caused by the provision of the camber angle.

Or, conversely, a toe angle is provided in order to balance the forces generated at the front tires and at the rear tires of the vehicle so as to ensure travelling stability of the vehicle, and the toe angle and the camber angle are combined so as to carry out adjustment for improving the traveling stability of the vehicle and minimizing the irregular wear of the tire under limiting conditions such as the structural dimensions of the vehicle and the like.

Accordingly, in order to improve the traveling stability and irregular wear resistance of the tire when the vehicle is traveling, it is important to adjust the toe angle and the camber angle, which are positional angles (wheel angles) applied to each wheel.

Adjustment of the toe angle and the camber angle is carried out with the vehicle disposed on a wheel alignment adjusting device.

The wheel alignment adjustment device includes a loading stand upon which a vehicle is loaded.

Loading portions are provided on the loading stand in correspondence with the tires. A wheel is loaded on each loading portion.

The loading portion includes a wheel rotating device such as a roller for rotating the wheel or an endless track, and force sensors which can sense the amounts of forces and the directions (vehicle longitudinal direction and vehicle transverse direction) of forces received by the wheel which is being rotated. On the basis of the results of sensing, the amounts of change of the toe angle and the camber angle and the like are displayed on a display device at the wheel alignment adjusting device.

Because tread bases of vehicles differ in accordance with the type of vehicle, the wheel alignment adjusting device includes a function of changing the distance, in the vehicle transverse direction, between the loading portions.

In a conventional wheel alignment adjusting device, the loading portions at the vehicle transverse direction right side ("right side loading portions") and the loading portions at the vehicle transverse direction left side ("left side loading portions") are supported so as to be movable along the vehicle transverse direction with respect to the loading stand. The right side loading portions and the left side loading portions are moved independent of one another by driving devices such as cylinders or the like, and are moved the same distances to the left and the right with respect to the transverse direction center of the device. (Namely, the right side loading portions and the left side loading portions are moved in directions of approaching each other in the vehicle transverse direction or in directions of moving away from each other in the vehicle transverse direction.) Thus, at least two driving devices for moving the loading portions, i.e., at least two for the left side and at least two for the right side, are needed, making the structure complex.

Further, it is difficult to accurately position the loading portions at the left and right sides (i.e., to fix the loading portions with respect to the loading stand). When the loading portions are moved, due to play of the device for example, the amount of change in the distance between the two loading portions for the front wheels, and the amount of change in the distance between the two loading portions for the rear wheels change. (There is actually the need to make the amount of change in the distance between the two loading portions for the front wheels and the amount of change in the distance between the two loading portions for the rear wheels equal). Further, the orientation of the wheel and the orientation of the loading portion (the direction in which the wheel is rotated) differ for each wheel, which may affect the accuracy of detection.

SUMMARY OF THE INVENTION

The present invention was developed in order to overcome the above problems, and an object of the present invention is to provide a wheel alignment adjusting device in which loading portions, upon which wheels of a vehicle are loaded, can be positioned with high accuracy.

A first aspect of the present invention is a wheel alignment adjusting device having a loading stand provided with a plurality of loading portions on which wheels of a vehicle are loaded, wherein loading portions at one vehicle transverse direction side are fixed to the loading stand, and loading portions at another vehicle transverse direction side are supported so as to be movable along a vehicle transverse direction with respect to the loading stand.

The vehicle is loaded on the loading stand such that the wheels of the vehicle are disposed on the corresponding loading portions.

When the vehicle transverse direction distance between the loading portions is changed in accordance with the tread base of the vehicle, the loading portions at another vehicle transverse direction side (e.g., the right side) are moved with respect to the fixed loading portions of one vehicle transverse direction side (e.g., the left side).

The loading portions at both vehicle transverse direction sides are not moved. Rather, the loading portions only at the other vehicle transverse direction side are moved. Thus, the number of driving devices for moving the loading portions can be decreased, which simplifies the structure of the wheel alignment adjusting device. Further, when the loading portions are moved, the loading portions can be positioned very accurately.

A second aspect of the present invention is a modified wheel alignment adjusting device of the first aspect, wherein the loading portions at another vehicle transverse direction side are mounted to a sub-base which is supported so as to be movable along the vehicle transverse direction with respect to the loading stand.

The other vehicle transverse direction side loading portions (for the front wheel and the rear wheel) are mounted to the sub-base, and the sub-base is structured so as to move along the vehicle transverse direction with respect to the loading stand. Thus, as compared with a case which loading portions for the front wheels and loading portions for the rear wheels are respectively moved independently, the accuracy of positioning the other vehicle transverse direction side loading portions (for the front wheel and the rear wheel) is improved.

In a third aspect of the present invention, the wheel alignment adjusting device of the second aspect further comprises a fixing device for fixing the sub-base and the loading stand.

Because the sub-base can be fixed to the loading stand by the fixing device, the sub-base can be prevented from coming out of position due to an external force or the like.

A fourth aspect of the present invention is a modified wheel alignment adjusting device of the third aspect, wherein the fixing device is provided at each of vehicle longitudinal direction sides of the sub-base.

The fixing device is provided at each of the vehicle longitudinal direction sides of the sub-base. Both vehicle longitudinal direction sides of the sub-base are fixed to the loading stand by the fixing devices. Thus, the positional accuracy of the sub-base is improved over a case in which the sub-base is fixed at one place.

DESCRIPTION OF THE PREFERRED EMBODIMENTS

An embodiment of a wheel alignment adjusting device will be described hereinafter with reference to FIGS. 1 through 16.

Figure 1:
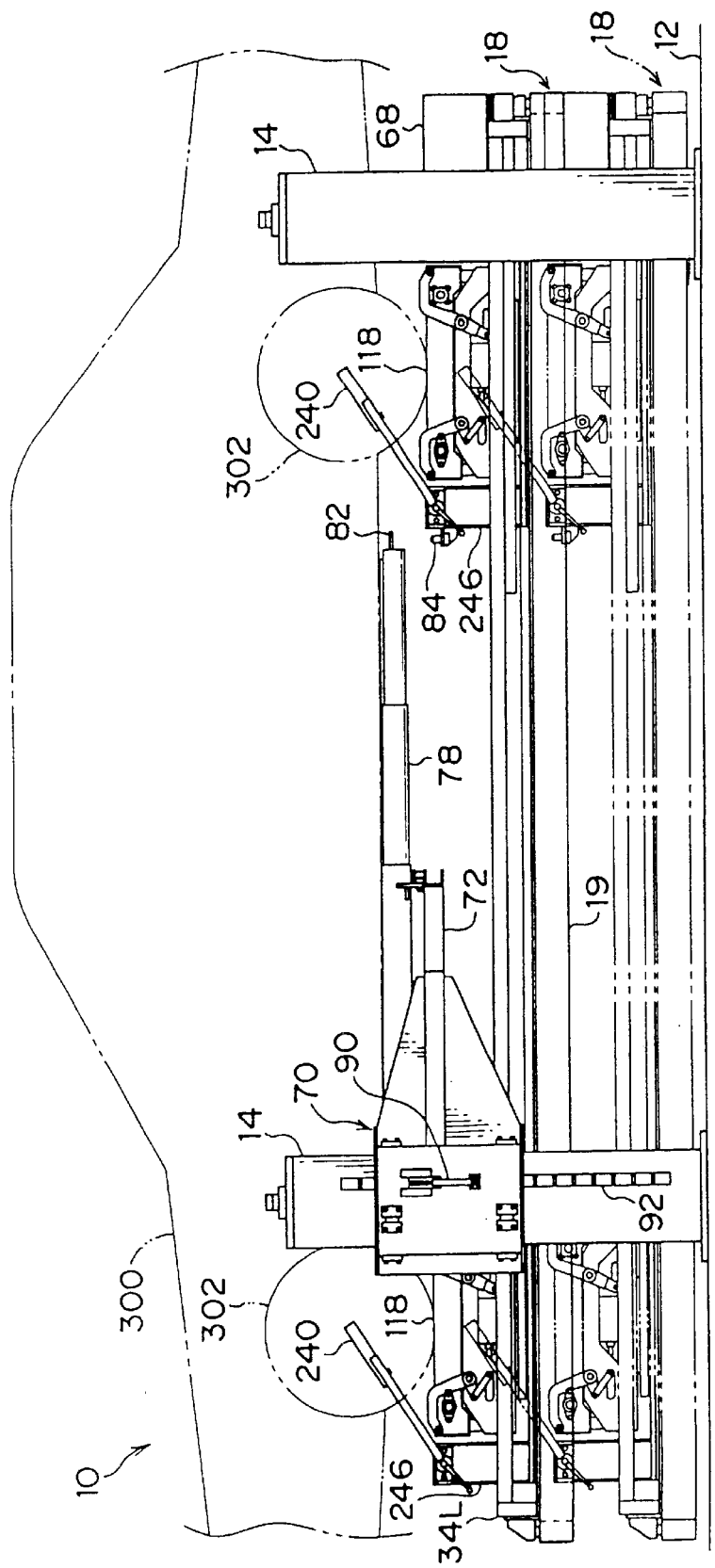
FIG. 1 is a side view, as seen from a left side of a wheel alignment adjusting device, illustrating a state in which a loading stand and a second sub-base are separated in the vertical direction.
Figure 4:
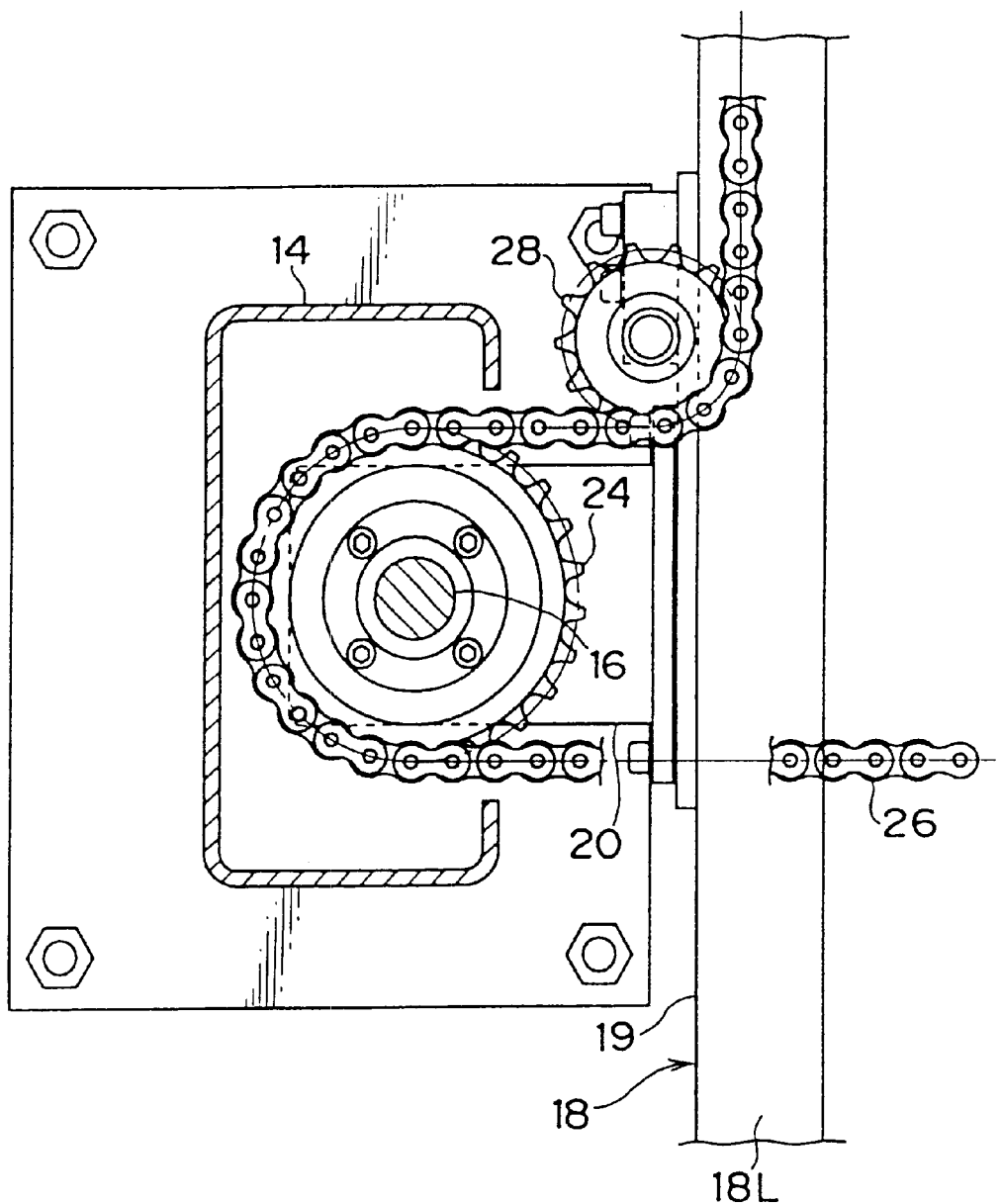
FIG. 4 is a horizontal sectional view of a vicinity of the supporting pillar.

As illustrated in FIGS. 1 and 4, a wheel alignment adjusting device 10 of the present embodiment includes four supporting pillars 14 which stand vertically upright at a floor surface 12.

Figure 2:
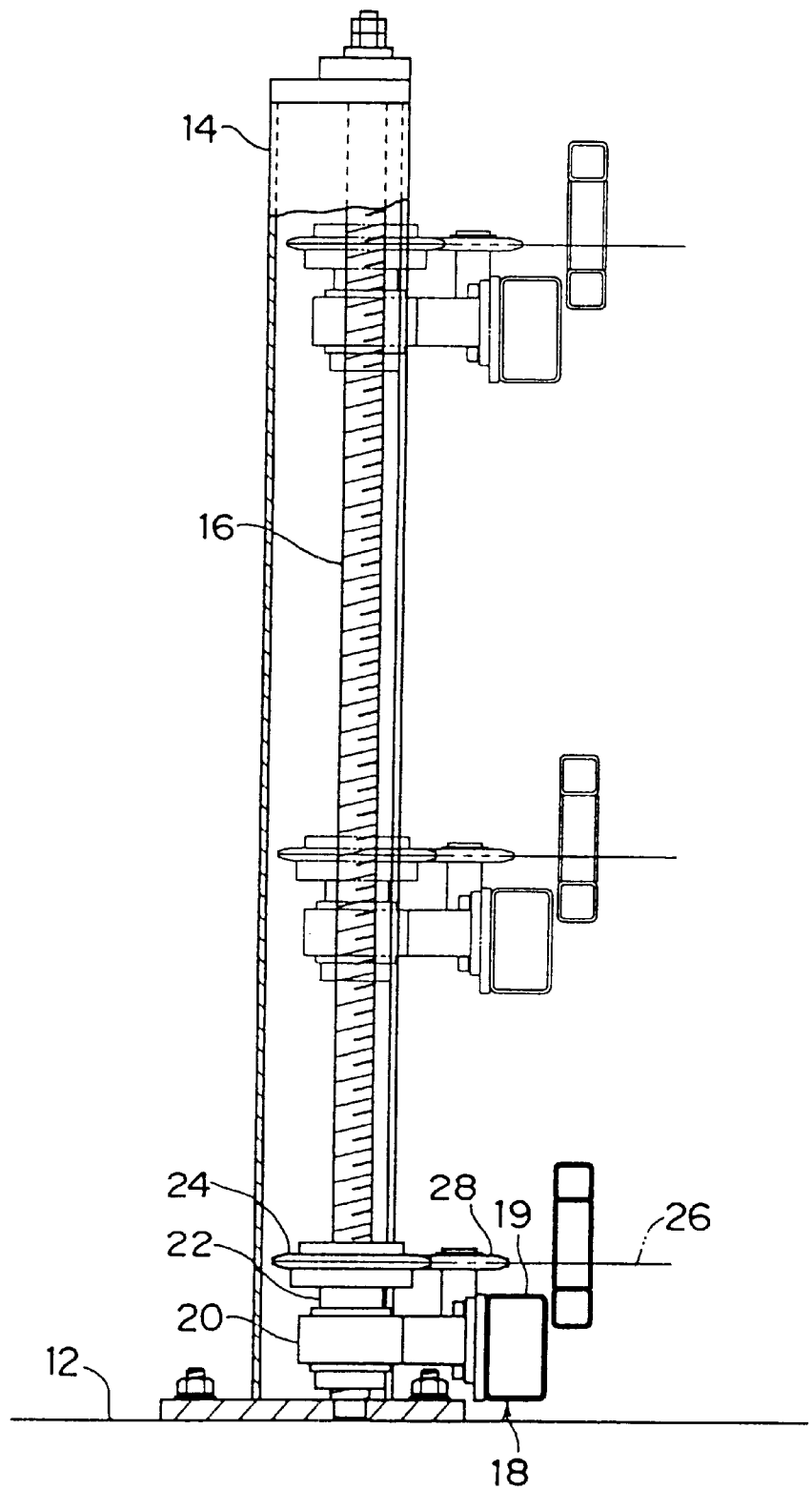
FIG. 2 is a vertical sectional view of a supporting pillar.

As illustrated in FIG. 2, a vertical feed screw 16 is fixed to the supporting pillar 14 in a state of being suspended from an upper portion of the supporting pillar 14.

Figure 3:
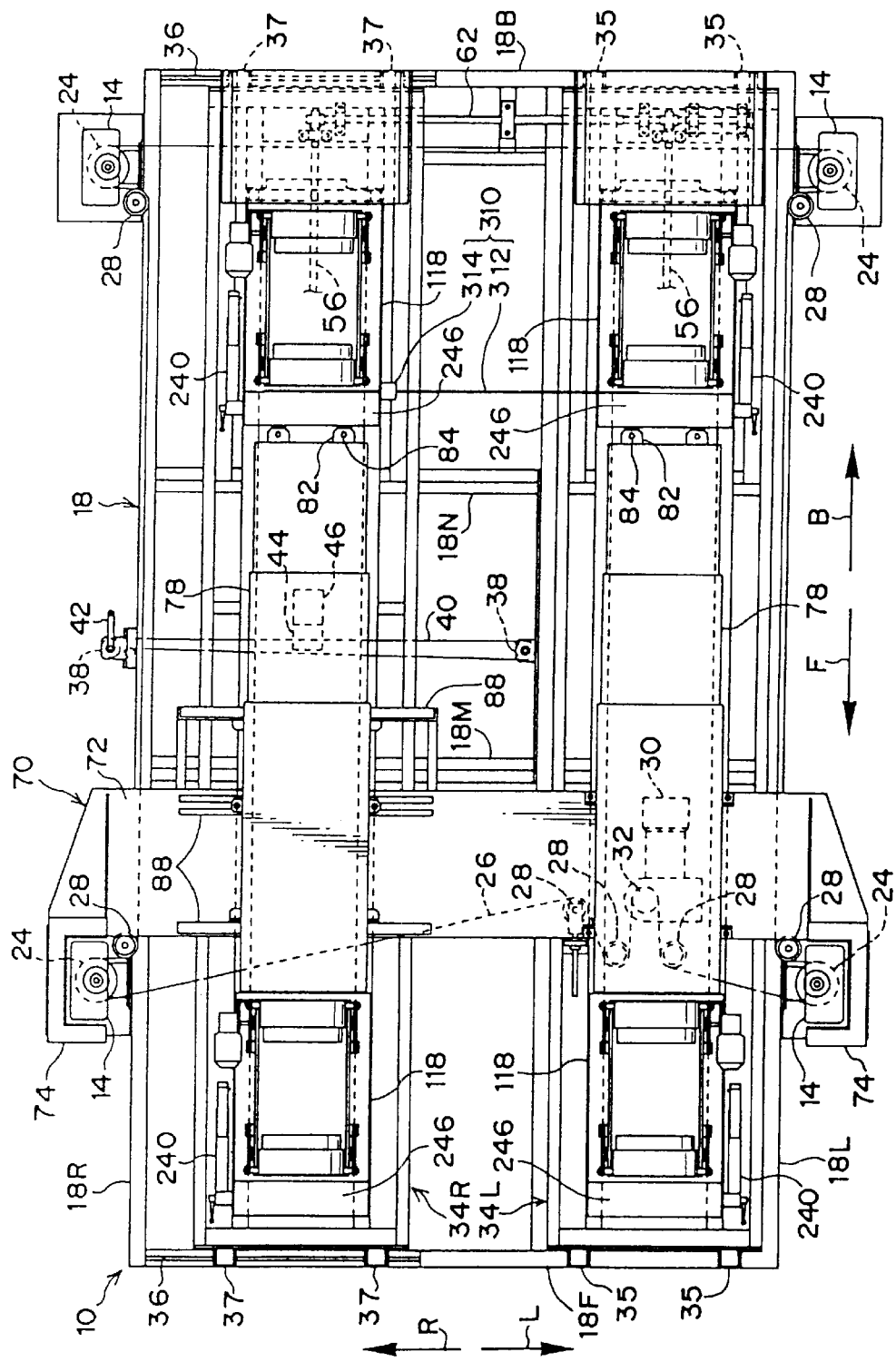
FIG. 3 is a plan view of the wheel alignment adjusting device illustrating a state in which loading stands for the rear wheels are disposed at a furthest rearward position.

As shown in FIG. 3, a loading stand 18 is disposed between the two supporting pillars 14 at the side in the direction of arrow R and the two supporting pillars 14 at the side in the direction of arrow L.

The loading stand 18 includes a substantially rectangular main frame 19 which is formed from frame members 18F, 18B, 18R, 18L, 18M, 18N.

As shown in FIG. 2, a shaft receiving portion 20 is mounted to a position of a side surface of the main frame 19 which position opposes the supporting pillar 14.

A rotating member 22, in which a female screw (not shown) is formed, is rotatably supported at the shaft receiving portion 20 via a bearing (not shown).

The female screw of the rotating member 22 screws together with the vertical feed screw 16. A sprocket 24 is coaxially fixed to the axial direction upper end portion of the rotating member 22.

As shown in FIGS. 2 through 4, the main frame 19 includes an endless chain 26 which meshes with the sprockets 24. The chain 26 is supported by plural sprockets 28 which are rotatably supported at the main frame 19. As shown in FIG. 3, a motor unit 30 which drives the chain 26 is mounted to the main frame 19. The chain 26 meshes with a sprocket 32 which is rotated by the motor unit 30. The chain 26 rotates the sprockets 24 of the respective supporting pillars 14 simultaneously. Thus, when the chain 26 is driven in a predetermined direction, the respective rotating members 22 rotate simultaneously such that the loading stand 18 is raised along the vertical feed screws 16. When the chain 26 is driven in the direction opposite to the predetermined direction, the loading stand 18 is lowered along the vertical feed screws 16.

As illustrated in FIG. 3, a first sub-base 34R and a first sub-base 34L, which extend in the direction of arrow F and in the direction of arrow B, are provided at the upper portion of the main frame 19.

The first sub-base 34L at the arrow L direction side is fixed to the main frame 19 by fixing hardware 35 or the like.

Guide rails 36, which extend along the direction of arrow R and the direction of arrow L, are mounted to the arrow F direction side and the arrow B direction side of the main frame 19.

A linear shaft receiving portion 37, which is engaged so as to be freely slidable along the guide rail 36, is mounted to each of the longitudinal direction end portions of the first sub base 34R. The first sub base 34R is slidable along the direction of arrow R and the direction of arrow L with respect to the main frame 19.

Load receiving rollers (not shown), which roll along the top surfaces of the frame members 18M, 18N which extend along the direction of arrow R and the direction of arrow L, are supported so as to be freely rotatable at the bottom surface of the first sub base 34R.

A pair of pulleys 38 is rotatably supported at a longitudinal direction intermediate portion of the main frame 19. An endless wire rope 40 is trained around the pair of pulleys 38.

A handle 42 is mounted to one of the pulleys 38 for rotation of that pulley 38.

A grasping claw 44, which can grasp the wire rope 40, is provided at the first sub-base 34R which is movably supported.

The grasping claw 44 is connected to a solenoid 46 provided at the first sub-base 34R. When the solenoid 46 is in an energized state, the grasping claw 44 grasps the wire rope 40, whereas when the solenoid 46 is in a non-energized state, the grasping claw 44 releases the wire rope 40.

Accordingly, by turning the handle 42 in the state in which the grasping claw 44 is grasping the wire rope 40, the movably supported first sub-base 34R can be moved in the direction of arrow R and the direction of arrow L.

Figure 5:
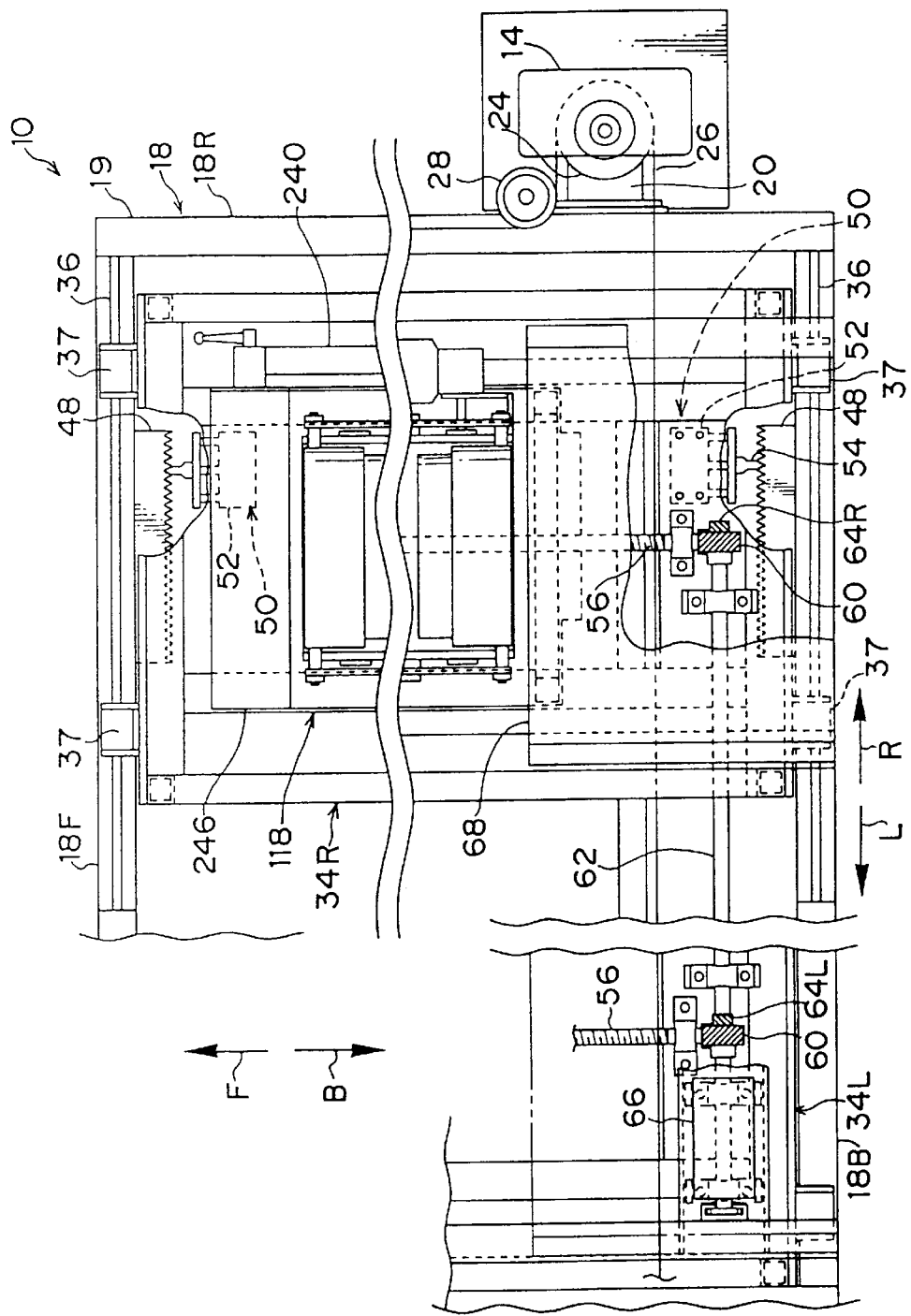
FIG. 5 is an enlarged plan view of vicinities of front and rear ends of the wheel alignment adjusting device.

As illustrated in FIG. 5, at the main frame 19, a rack 48 is fixed to each of the arrow F direction side frame member 18F and the arrow B direction side frame member 18B.

A lock device 50 is disposed at each of the arrow F direction side end portion and the arrow B direction side end portion of the movably supported first sub-base 34R. The lock device 50 is provided with an wedge-shaped tooth 54 which is driven by a solenoid 52 to move in directions of approaching and moving apart from the rack 48 of the main frame 19. Due to the tooth 54 entering into the space ("valley") between two teeth of the rack 48, the movably supported first sub-base 34R is accurately positioned and fixed, parallel to the first sub-base 34L which is fixed to the main frame 19.

Usually, the solenoid 52 of the lock device 50 is in a non-energized state, and at this time, the tooth 54 is entered into a valley of the rack 48 as illustrated in FIG. 5 (locked state). On the other hand, when the solenoid 52 is energized, the tooth 54 separates from the rack 48 (unlocked state).

As illustrated in FIG. 3, a tire driving device 118 is provided in a vicinity of the arrow F direction side end portion and in a vicinity of the arrow B direction side end portion of the first sub-base 34R and the first sub-base 34L, respectively. The internal structure of the tire driving device 118 will be described later.

The tire driving device 118 at the arrow B direction side of the first sub-base 34R is supported by a mechanism, which will be described layer, so as to be slidable in the direction of arrow F and in the direction of arrow B with respect to the first sub-base 34R. The tire driving device 118 at the arrow F direction side of the first sub-base 34R is fixed and does not slide in the direction of arrow F and the direction of arrow B with respect to the first sub-base 34R.

Similarly, the tire driving device 118 at the arrow B direction side of the first sub-base 34L is supported, by a mechanism which will be described later, so as to be slidable in the direction of arrow F and in the direction of arrow B with respect to the first sub-base 34L. The tire driving device 118 at the arrow F direction side of the first sub-base 34L is fixed and does not slide in the direction of arrow F and the direction of arrow B with respect to the first sub-base 34L.

A feed screw 56, which extends along the moving direction of the slidably supported tire driving device 118, is rotatably supported at the first sub-base 34R which is supported so as to be movable.

Figure 12:
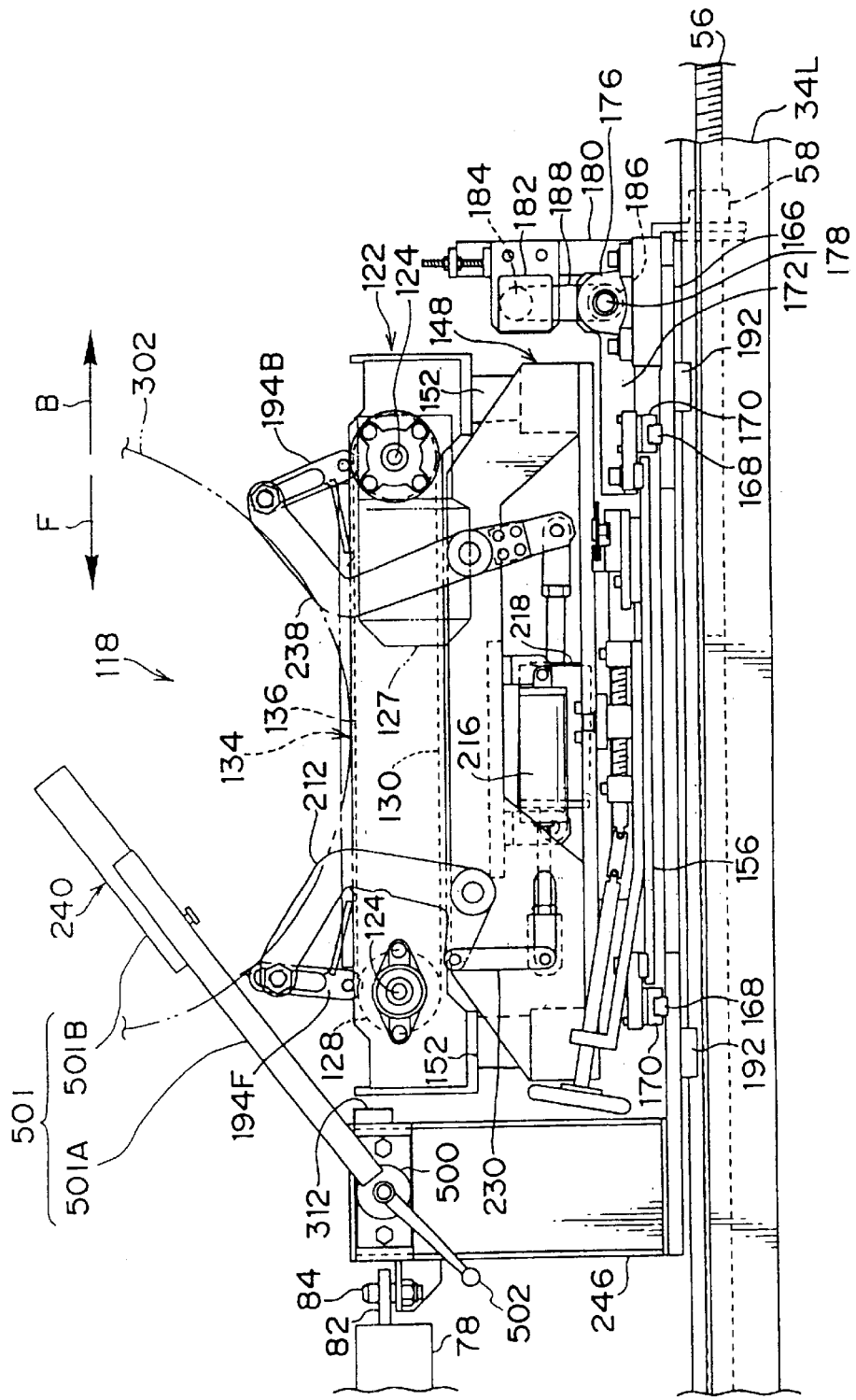
FIG. 12 is a side view, as seen from the left side, of the tire driving device in a state in which a wheel stopping plate is inclined.

As illustrated in FIG. 12, a nut 58 having a female screw (not shown) which screws together with the feed screw 56, is fixed to the slidably supported tire driving device 118. By rotating the feed screw 56, the tire driving device 118 having the nut 58 can be moved in the direction of arrow F and in the direction of arrow B.

As shown in FIG. 5, a gear 60 is fixed to the arrow B direction side end portion of the feed screw 56.

Because the first sub-base 34L has the same structure as that of the first sub-base 34R, except for the fact that the first sub-base 34L is fixed to the main frame 19, description of the first sub-base 34L will be omitted.

As shown in FIG. 5, a shaft 62 which extends along the arrow R direction and the arrow L direction is rotatably supported at the arrow B direction side of the main frame 19.

The shaft 62 is formed from two shafts of different diameters. A spline shaft portion is provided at the outer surface of the narrow-diameter shaft. A spline hole portion, with which the spline shaft portion engages, is formed in the large-diameter shaft. Thus, the two shafts are engaged such that torque can be transmitted from one shaft to the other, and relative movement in the axial direction thereof of one shaft to the other is possible.

A gear 64R, which meshes with the gear 60 of the feed screw 56 provided at the first sub-base 34R, is fixed to the arrow R direction end portion of the shaft 62. A gear 64L, which meshes with the gear 60 of the feed screw 56 provided at the first sub-base 34L, is fixed to the arrow L direction end portion of the shaft 62. By rotating the shaft 62, the two feed screws 56 are rotated simultaneously, and the slidably supported two tire driving devices 118 can be moved simultaneously and by the same amount and in the same direction.

Rotating driving force from a motor unit 66 provided at the main frame 19 is transferred to the shaft 62 via a chain (not shown).

Figure 6:
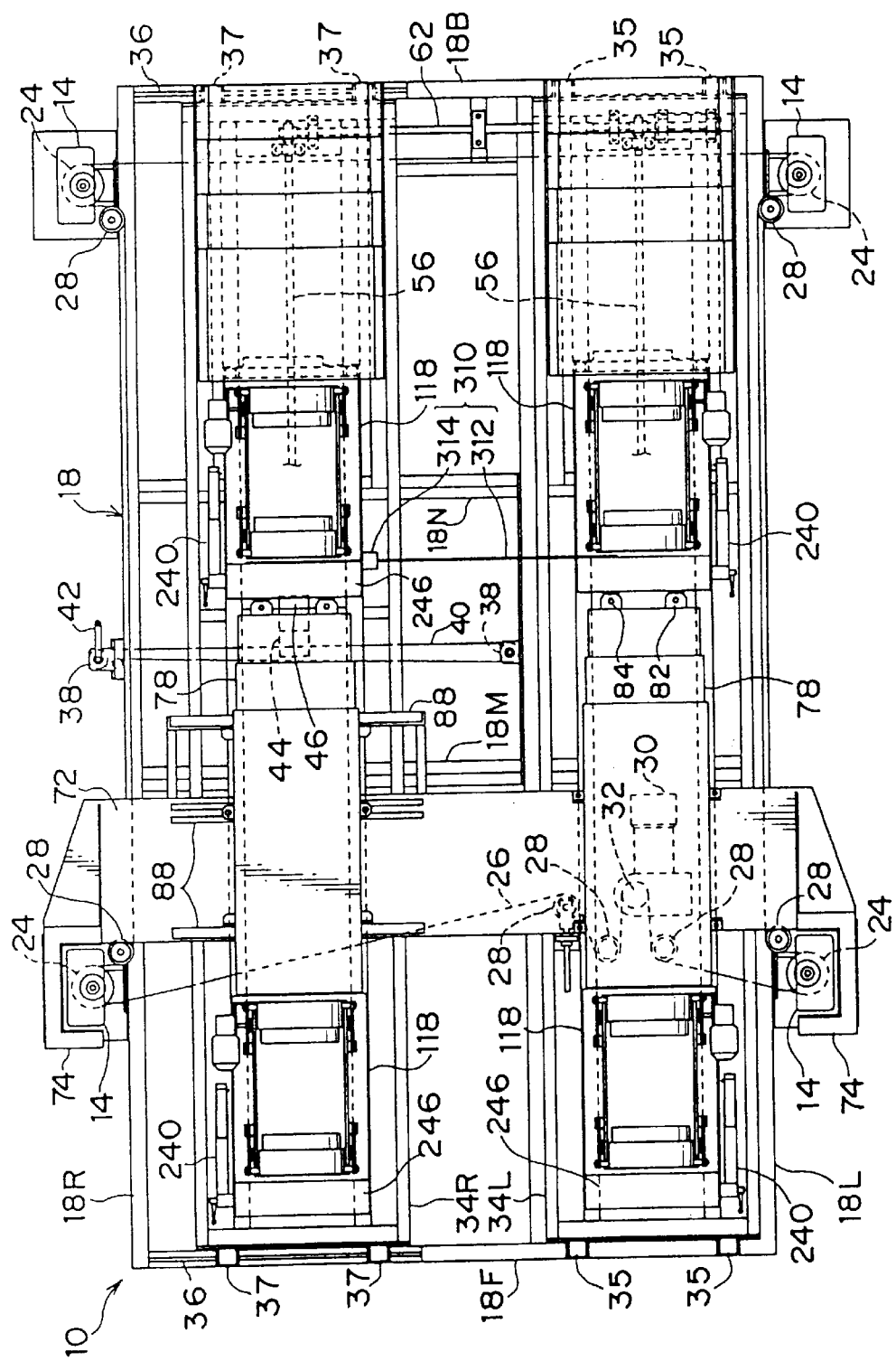
FIG. 6 is a plan view of the wheel alignment adjusting device, and illustrates a state in which the loading stands for the rear wheels are moved slightly forward.
Figure 7:
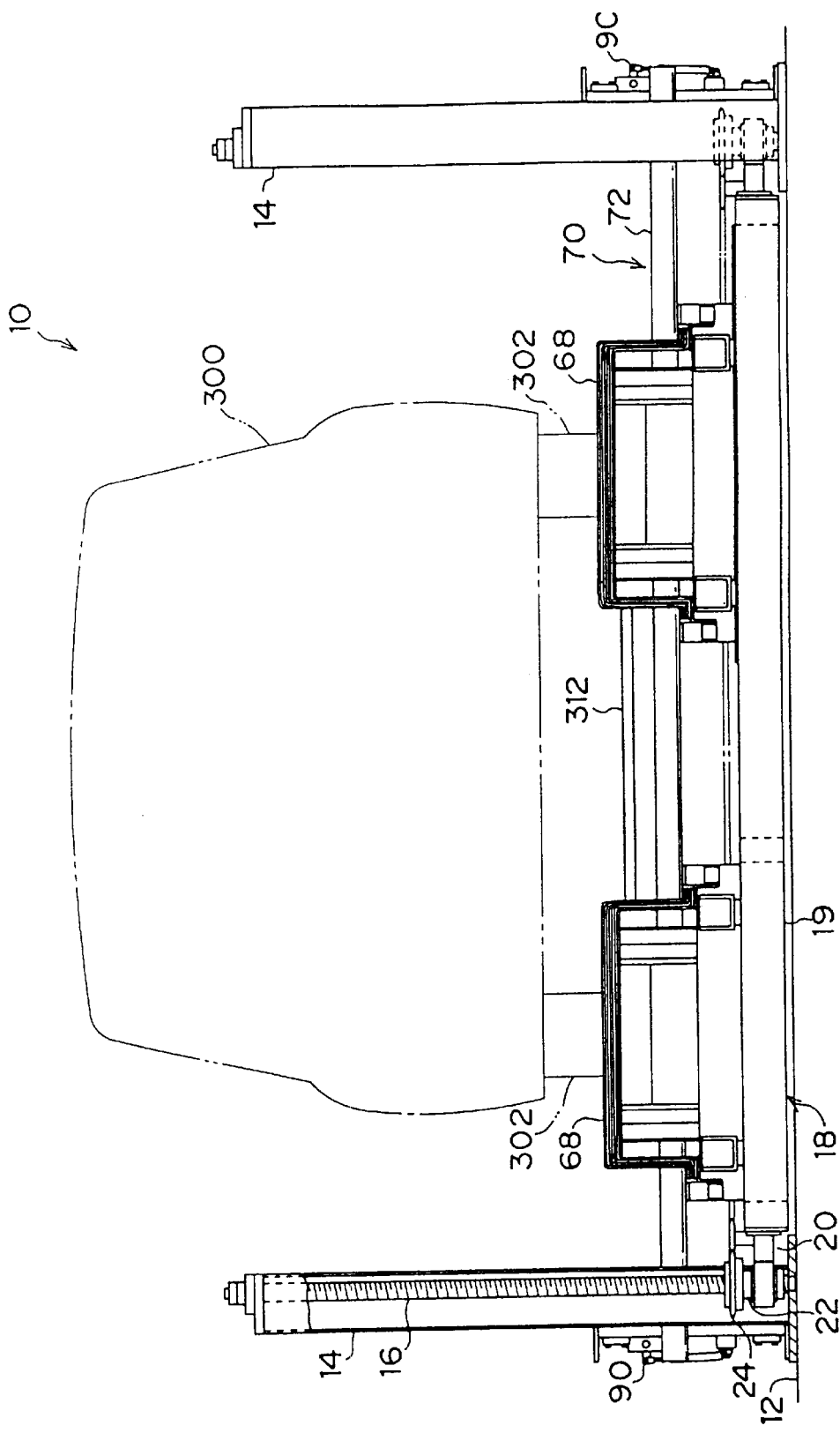
FIG. 7 is a side view of the wheel alignment adjusting device as seen from the rear.

As illustrated in FIGS. 6 and 7, at each of left and right sides, one end of a first transfer plate 68 is fixed to the arrow B direction side tire driving device 118. The first transfer plate 68 is formed from a plurality of substantially U-shaped (in cross section) plate members and is expandable and contractible along the direction of arrow F and the direction of arrow B. The other end of the first transfer plate 68 is fixed to the arrow B direction side frame member 18B of the main frame 19.

Figure 8:
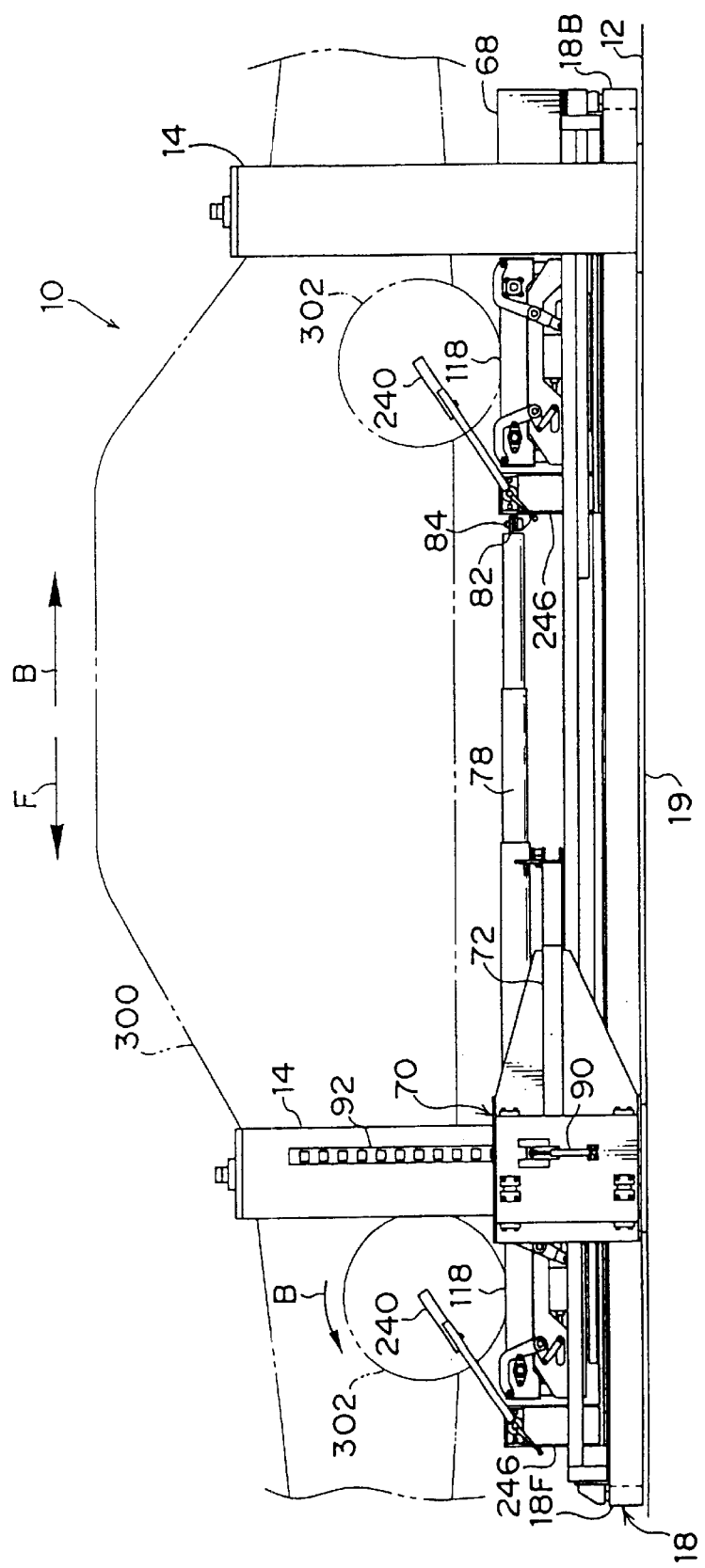
FIG. 8 is a side view, as seen from the left side of the wheel alignment adjusting device, illustrating a state in which the loading stand and a second sub-base have been lowered to a lowermost position.

The upper surface of the tire driving device 118 and the upper surface of the first transfer plate 68 are set at substantially the same height as illustrated in FIG. 8.

Accordingly, even if the slidably supported tire driving device 118 moves in the direction of arrow F, the first transfer plate 68 extends. Therefore, regardless of the position of the tire driving device 118, a vehicle 300 (wheel 302) can be moved from the arrow B direction side of the loading stand 18 onto the tire driving device 118.

As illustrated in FIGS. 6 and 8, a second sub-base 70 is provided on the loading stand 18.

As illustrated in FIG. 6, the second sub-base 70 is provided with a horizontal member 72 which extends horizontally so as to span between the two arrow F direction side supporting pillars 14.

A supporting portion 74, which is formed so as to enclose three side surfaces of the supporting pillar 14, is provided at each of the arrow R direction end portion and the arrow L direction end portion of the horizontal member 72.

Figure 9:
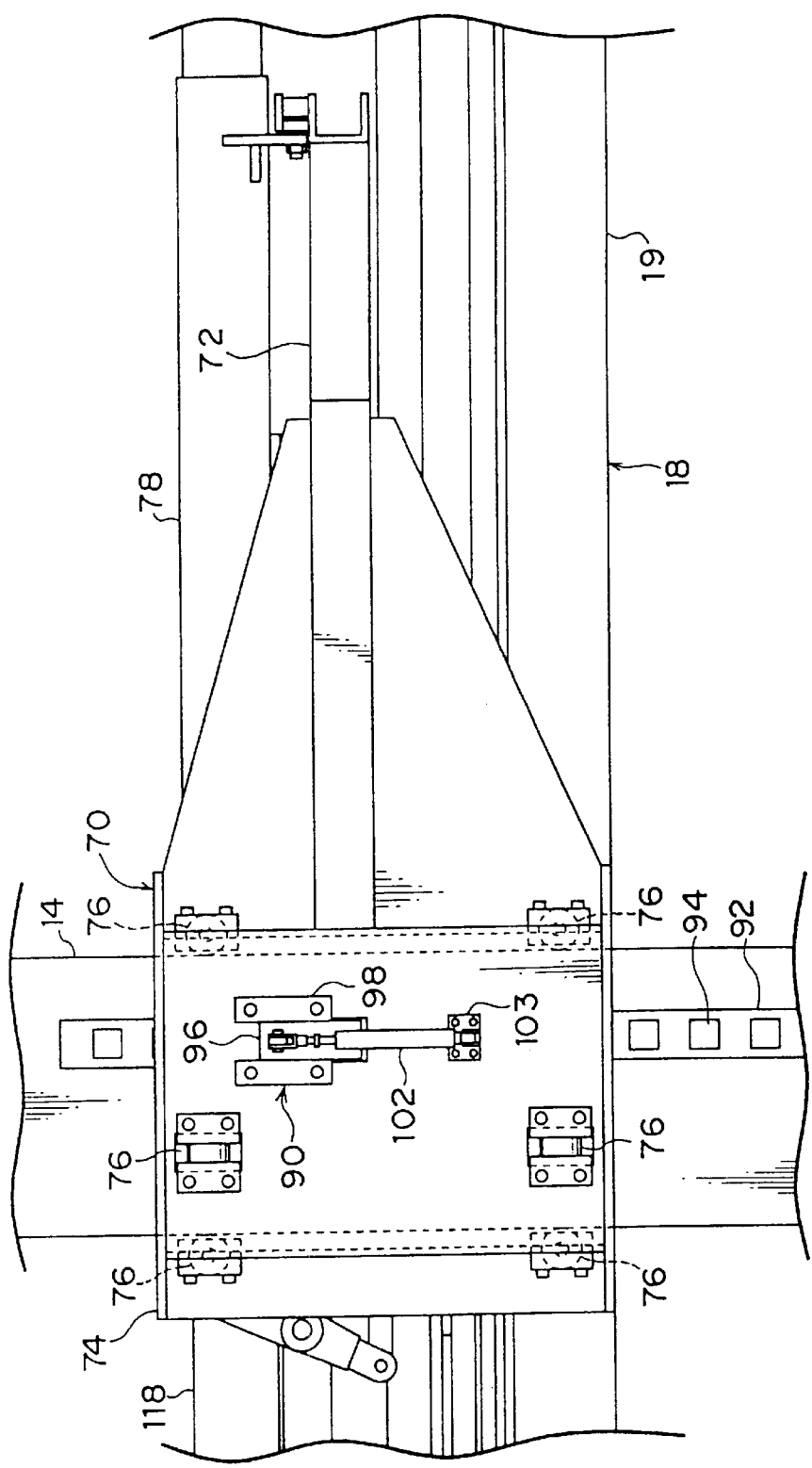
FIG. 9 is a side view, as seen from the left side, of a vicinity of a supporting portion of the second sub-base.

As illustrated in FIG. 9, a plurality of guide rollers 76 are rotatably supported at the supporting portion 74 so as to abut three side surfaces of the supporting pillar 14. The second sub-base 70 can be moved vertically while being guided by the supporting pillars 14.

As illustrated in FIG. 6, a second transfer plate 78 is provided at each of the arrow R direction side and the arrow L direction side at the top portion of the second sub-base 70.

The second transfer plate 78 is formed from a plurality of plates, and is extendable in the direction of arrow B from the second sub-base 70.

The top surface of the second transfer plate 78 and the top surface of the arrow F direction side tire driving device 118 are set to be substantially the same height as illustrated in FIG. 8.

As illustrated in FIG. 12, plate members 82 are provided at the arrow B direction side end portion of the second transfer plate 78. A hole which extends vertically is formed in each plate member 82.

Pins 84, each of whose axial direction is the vertical direction, are provided in a vicinity of the upper end of the arrow F direction side of a supporting stand 246 (which will be described later) which is provided at the arrow B direction side tire driving device 118 which is supported so as to be movable.

The pin 84 can be inserted into the hole of the plate member 82 from below. When the movable tire driving device 118 is moved in the direction of arrow B in a state in which the pin 84 is inserted into the hole of the plate member 82, the second transfer plate 78 extends (see FIGS. 3 and 9) in a state in which it spans between the second sub-base 70 and the movably supported tire driving device 118. When the movable tire driving device 118 moves in the direction of arrow F, the second transfer plate 78 becomes shorter (see FIG. 6).

The second transfer plate 78 at the arrow L direction side is fixed with respect to the horizontal member 72 such that this second transfer plate 78 does not move in the direction of arrow R and in the direction of arrow L.

Referring now to FIG. 3, a plurality of guide rollers (not illustrated) are rotatably supported at the arrow R direction side second transfer plate 78. These guide rollers engage with a plurality of guide rails 88 which are provided at the horizontal member 72 and extend in the direction of arrow R and the direction of arrow F. As a result, the second transfer plate 78 at the arrow R direction side can slide in the direction of arrow R and the direction of arrow L with respect to the horizontal member 72. When the first sub-base 34R is moved in the direction of arrow R or in the direction of arrow L with the pin 84 inserted into the hole of the plate member 82 (see FIG. 8), the second transfer plate 78 also is moved in the direction of arrow R or in the direction of arrow L, such that the two tire driving devices 118 on the first sub-base 34R and the second transfer plate 78 at the arrow R direction side are always maintained in a relation of being disposed on a straight line.

Figure 10:
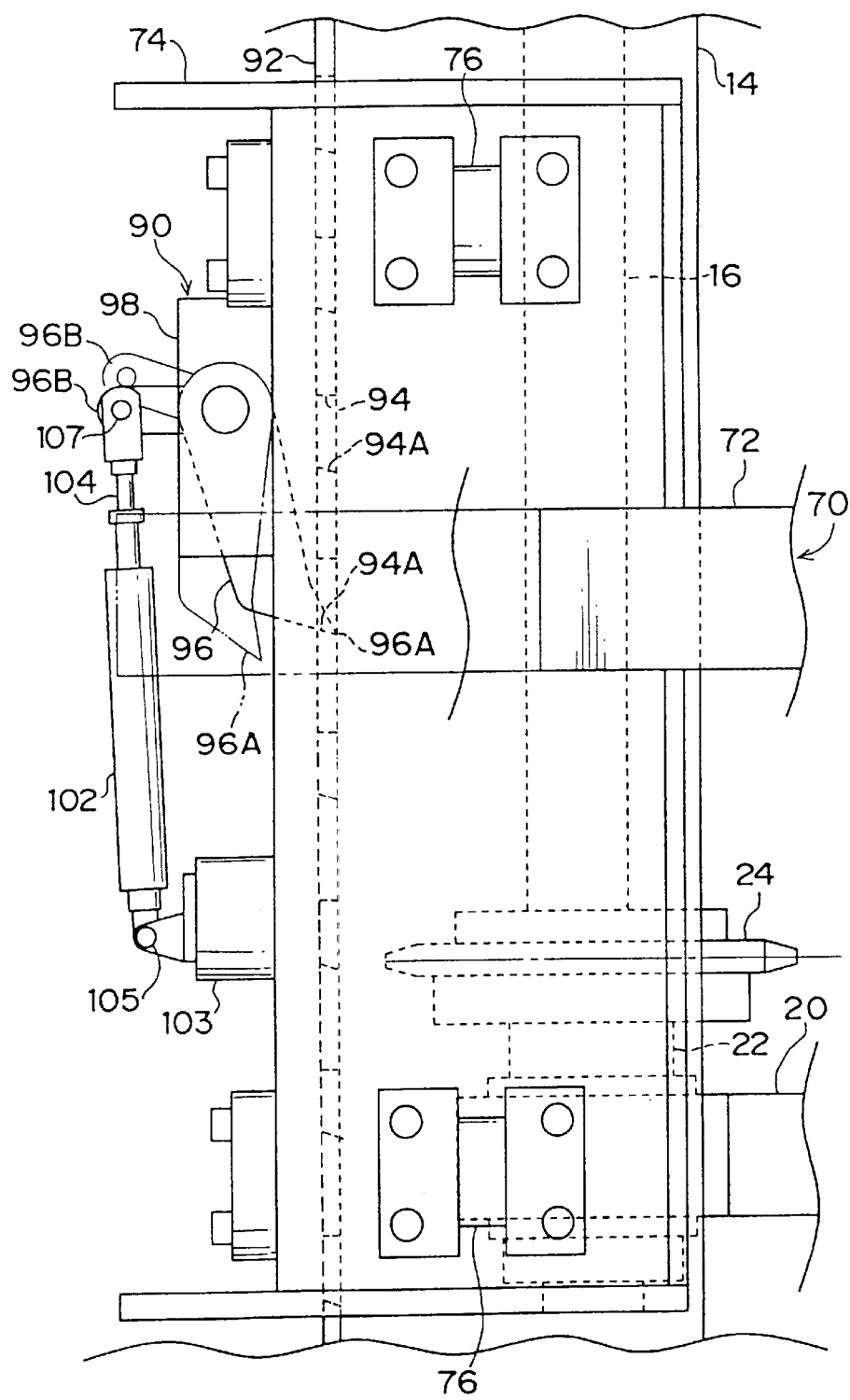
FIG. 10 is a side view, as seen from the rear, of the vicinity of the supporting portion of the second sub-base.

As illustrated in FIG. 9 and FIG. 10, the second sub-base 70 includes a lock device 90 at each supporting portion 74. A lock plate 92 is provided at each supporting pillar 14 corresponding to respective supporting portions 74.

The lock plate 92 is formed so as to be long in the vertical direction, and a plurality of square holes 94 are formed in the lock plate 92 in the vertical direction at uniform intervals.

The lock device 90 includes a lock lever 96 which engages with the square holes 94.

The intermediate portion of the lock lever 96 is supported and is swingable at a shaft receiving portion 98 fixed to the supporting portion 74. A vicinity of a lower end 96A of the lock lever 96 can be inserted into the square holes 94.

A lower end 94A of the square hole 94 is formed so as to be inclined slightly downward toward the inner side thereof (the supporting pillar 14 side thereof) from the outer side thereof. The lower surface in the vicinity of the lower end 96A of the lock lever 96 is formed so as to contact in parallel the lower end 94A of the square hole 94 in a state in which the lower end 96A of the lock lever 96 is inserted into the square hole 94. When load is applied to the lock lever 96, the lock lever 96 receives the force in the direction in which the lower end 96A thereof enters into the square hole 94.

The lock device 90 includes a double-acting air cylinder 102 (i.e., an air cylinder of the type having, at both sides of the piston, an air chamber into which air is made to enter and from which air is made to leave).

The main body of the air cylinder 102 is supported via a pin 105 at a supporting member 103 of the supporting portion 74, such that the air cylinder 102 is swingable.

A distal end of a piston rod 104 of the air cylinder 102 is connected via a pin 107 to an upper end 96B of the lock lever 96.

Figure 15:
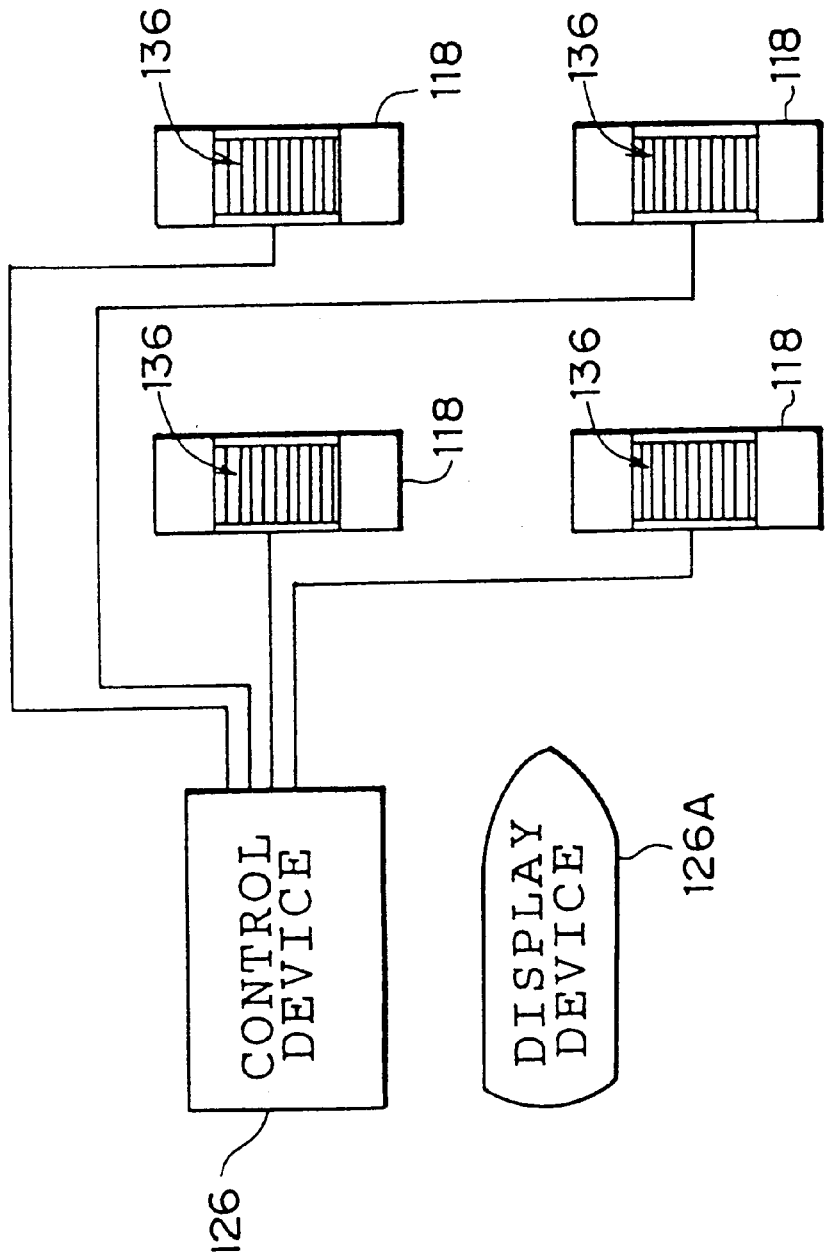
FIG. 15 is a schematic structural view of a control system of the wheel alignment adjusting device.

A solenoid valve, a pressure regulating valve, an air compressor and the like (all not shown) are connected to the air cylinder 102. The operation of the solenoid valve and the air compressor is controlled by a control device 126 which is shown in FIG. 15.

The control device 126 can be formed by, for example, a microcomputer. A display device 126A, which is a CRT or the like for displaying the values measured by a force sensor 152 which will be described later and for displaying the adjustment direction of the positional angle of the wheel 302 and the like, is connected to the control device 126.

Usually, the air cylinder 102 urges the lock lever 96, by air pressure, in a direction in which the bottom end 96A of the lock lever 96 approaches the lock plate 92.

Accordingly, when the loading stand 18 is raised such that the second sub-base 70 rises, the lower end 96A of the lock lever 96 engages successively with the plurality of square holes 94 while sliding along the lock plate 92 or the side surface of the supporting pillar 14. When the loading stand 18 is lowered, the lower end 96A of the lock lever 96 is inserted into the square hole 94 and the lower end 96A catches on the lower end 94A (the state illustrated by the dotted line in FIG. 10) such that the lowering of the second sub-base 70 is stopped and only the loading stand 18 is lowered.

When the second sub-base 70 is lowered together with the loading stand 18, first, the second sub-base 70 is supported and lifted slightly from below by the loading stand 18. The lower end 96A of the lock lever 96 moves upward so as to separate from the lower end 94A of the square hole 94 of the lock plate 92, and the lock lever 96 becomes slidable. In this state, the air cylinder 102 is operated and the lock lever 96 rotates so that the lower end 96A comes out from the square hole 94.

Next, when the lower end 96A of the lock lever 96 is maintained in the state of being out of the square hole 94 and the loading stand 18 is lowered, the second sub-base 70 can be lowered together with the loading stand 18 while in a state of being loaded on the loading stand 18.

In the present embodiment, the arrow R direction side lock device 90 and the arrow L direction side lock device 90 are provided separately. However, the present invention is not limited to the same. For example, the lock lever 96 of the arrow R direction side lock device 90 and the lock lever 96 of the arrow L direction side lock device 90 may be connected and interlocked by a connecting means such as a rod or a link mechanism or the like.

Tire Driving Device

Figure 11:
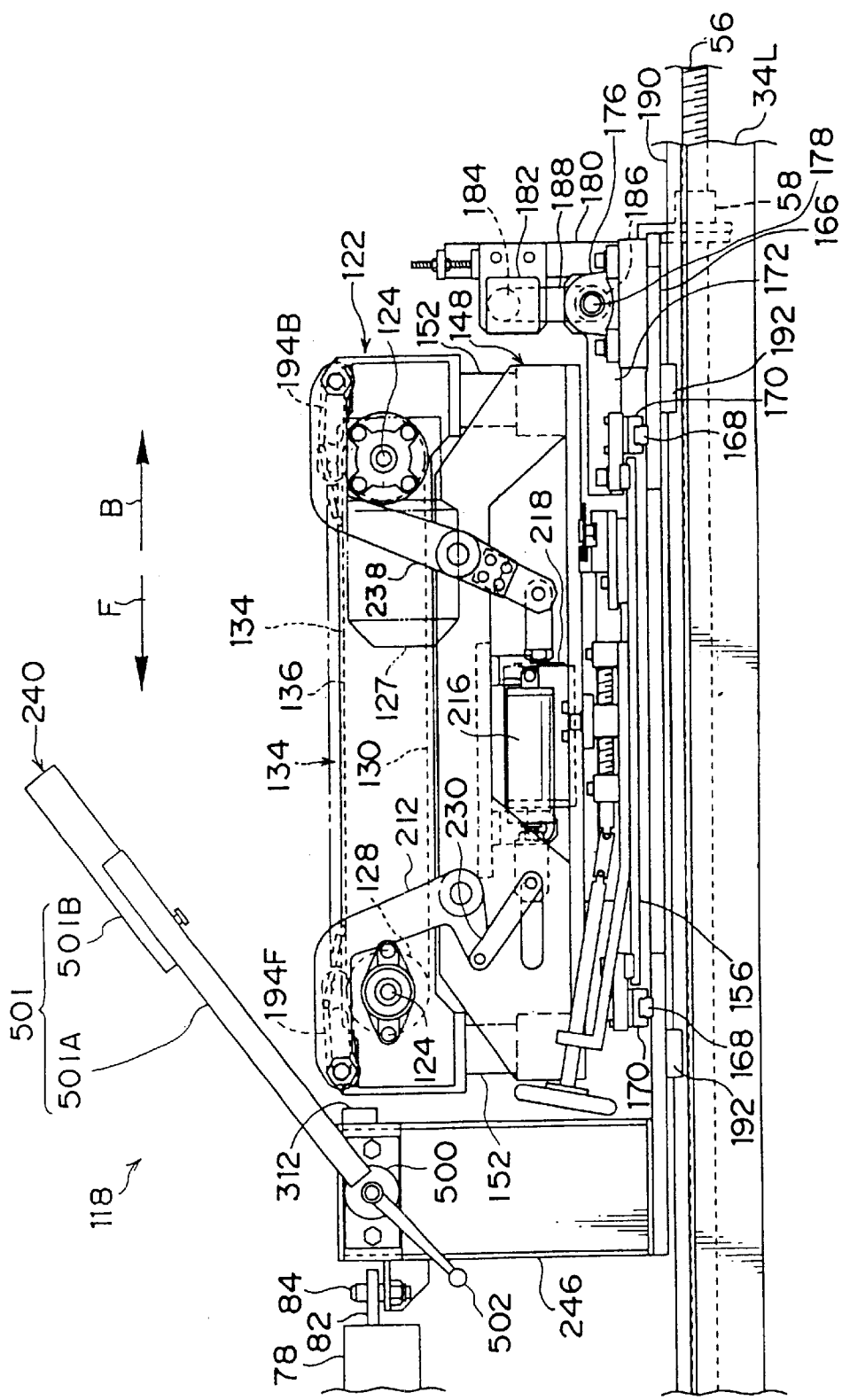
FIG. 11 is a side view, as seen from the left side, of a tire driving device.

As illustrated in FIG. 11, the tire driving device 118 includes a frame 122.

A pair of drive shafts 124, to which sprockets 128 are mounted, are rotatably supported at the frame 122.

One of the drive shafts 124 is connected to a motor 127 whose driving is controlled by the control device 126 (see FIG. 15).

An endless chain 130 is trained around the sprocket 128 of one drive shaft 124 and the sprocket 128 of the other drive shaft 124.

Long, thin plates 132 (see FIG. 13) are connected to the chain continuously along the longitudinal direction of the chain 130, so as to form an endless track 134. The long, thin plate 132 has a length which is sufficiently longer than the width of the tire, and has a width which is of an extent that does not permit the long, thin plate 132 to enter into the grooves of the tread pattern of the tire.

Figure 13:
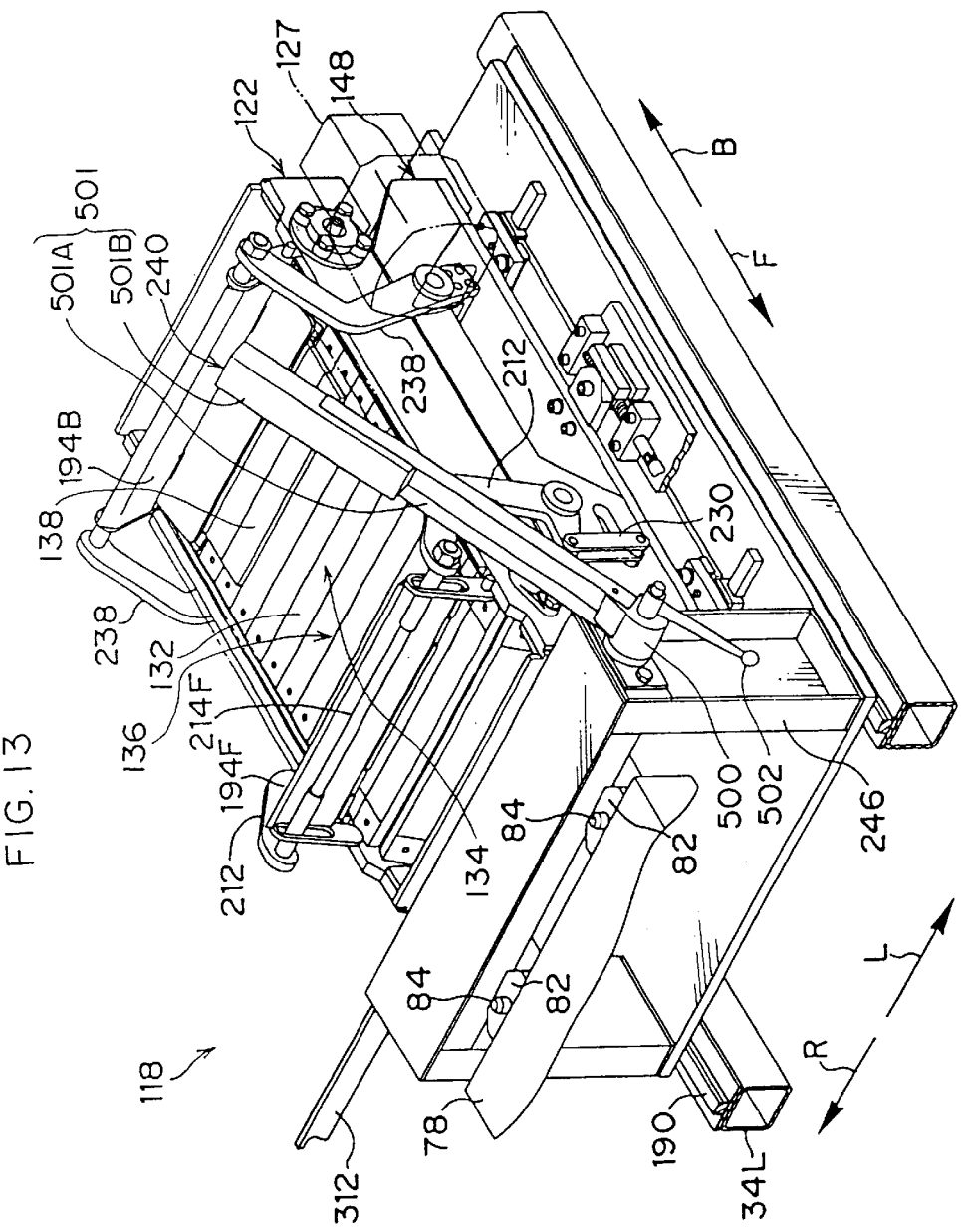
FIG. 13 is a perspective view of the tire driving device, and illustrates a state in which the wheel stopping plate is inclined.

As illustrated in FIG. 13, a plurality of protrusions 138 are formed along the circulating direction, on the outer peripheral surface of the endless track 134, so as to form one protruding portion. As seen from above the tire driving device 118, the surface formed by the upper surfaces of the plurality of plates 132 is called the tire driving surface 136.

The structure disclosed in, for example, Japanese Patent Application Laid-Open (JP-A) No. 10-7013 may be used as the driving portion of the endless track 134.

As illustrated in FIG. 11, a supporting frame 148 is disposed beneath the frame 122. The frame 122 is disposed on the supporting frame 148 via force sensors 152. The force sensor 152 can detect the magnitude and the direction of the force applied to the frame 122 via the endless track 134, and outputs the results of measurement to the control device 126.

As shown in FIG. 11, the supporting frame 148 is mounted to the top surface of vehicle transverse direction moving base plate 156.

A longitudinal direction moving base plate 166 is disposed horizontally beneath the vehicle transverse direction moving base plate 156.

A pair of guide rails 168 for left and right sliding, which extend along the left and right directions of the vehicle (the direction orthogonal to the surface of the drawing of FIG. 11) are mounted to the top surface of the longitudinal direction moving base plate 166.

A linear shaft receiving portion 170 is slidably supported at each of the guide rails 168 for left and right sliding. The vehicle transverse direction moving base plate 156 is mounted to the linear shaft receiving portions 170.

Accordingly, the vehicle transverse direction moving base plate 156 is supported so as to be movable along the left and right directions of the vehicle along the guide rails 168 for left and right sliding, with respect to the longitudinal direction moving base plate 166.

A bracket 172 is mounted to the transverse direction moving base plate 156 so as to protrude in the direction of arrow B. A nut (not illustrated), in which a female screw is formed and whose axial direction is along the vehicle left and right directions, is mounted to the distal end portion of the bracket 172.

A feed screw 178, which is rotatably supported by a shaft receiving portion 176, is provided at the longitudinal direction moving base plate 166. A nut is screwed together with the feed screw 178.

A motor 182, which is mounted to a bracket 180, is provided at the longitudinal direction moving base plate 166.

A pulley 184 is mounted to the rotating shaft of the motor 182. A pulley 186 is mounted to the one end of the feed screw 178 which opposes the pulley 184.

An endless timing belt 188 is trained about the pulley 184 and the pulley 186.

The motor 182 is connected to the control device 126 (see FIG. 15). The driving of the motor 182 is controlled by the control device 126.

In this way, when the motor 182 is driven and the feed screw 178 is rotated, the vehicle transverse direction moving base plate 156, the frame 122, the supporting frame 148 and the like integrally move in the left and right directions of the vehicle with respect to the longitudinal direction moving base plate 166.

As illustrated in FIG. 11 and FIG. 13, a pair of guide rails 190 for longitudinal sliding, which extend parallel to one another along the direction of arrow F and the direction of arrow B, are mounted to the top surfaces of the first sub-base 34L and the first sub-base 134R (not illustrated in FIGS. 11 and 13).

A plurality of linear shaft receiving portions 192, which fit together with the guide rails 190 for longitudinal sliding, are mounted to the bottom surface of the longitudinal direction moving base plate 166, such that the tire driving device 118 is supported so as to be movable in the longitudinal direction of the vehicle.

The nut 58 which screws together with the feed screw 56 is mounted to the longitudinal direction moving base plate 166 of the movably supported tire driving device 118. As a result, by rotating the feed screw 56 as described previously, the movably supported tire driving device 118 can be moved in the longitudinal direction.

As shown in FIGS. 11, 12 and 13, a wheel stopping plate 194F is provided swingably at the frame 122 at the arrow F direction side of the tire driving device 118, and a wheel stopping plate 194B is provided swingably at the frame 122 at the arrow B direction side of the tire driving device 118. The wheel stopping plates 194F and 194B are provided so as to straddle across the tire driving device 118 as shown in FIG. 13.

Driving force of a first cylinder 216 provided on the supporting frame 148 is transferred to the wheel stopping plate 194F via a short link 230 and a link 212 such that the wheel stopping plate 194F swings.

On the other hand, driving force of a second cylinder 218 provided on the supporting frame 148 is transferred via a link 238 to the wheel stopping plate 194B such that the wheel stopping plate 194B swings.

In the present embodiment, when the vehicle 300 is to be moved, as illustrated in FIG. 11, the wheel stopping plate 194F and the wheel stopping plate 194B are disposed horizontally. Namely, the wheel stopping plate 194F and the wheel stopping plate 194B are disposed so as to not prevent the wheel from moving on the tire driving device 118. When the wheels 302 are to be fixed, the wheel stopping plate 194F and the wheel stopping plate 194B are raised and set at an incline as illustrated in FIGS. 12 and 13.

The driving of the first cylinder 216 and the second cylinder 218 is controlled by the control device 126 (see FIG. 15).

As illustrated in FIG. 3, a left and right connecting device 310 is provided at the two tire driving devices 118 at the arrow B direction side. The left and right connecting device 310 is formed from a flat steel member 312 and a nipping device 314. One end of the flat steel member 312 is fixed to the arrow L direction side tire driving device 118, and the flat steel member 312 extends toward the arrow R direction side. The nipping device 314 is provided at the arrow R direction side tire driving device 118, and fixably nips the flat steel member 312 therewith.

Figure 14:
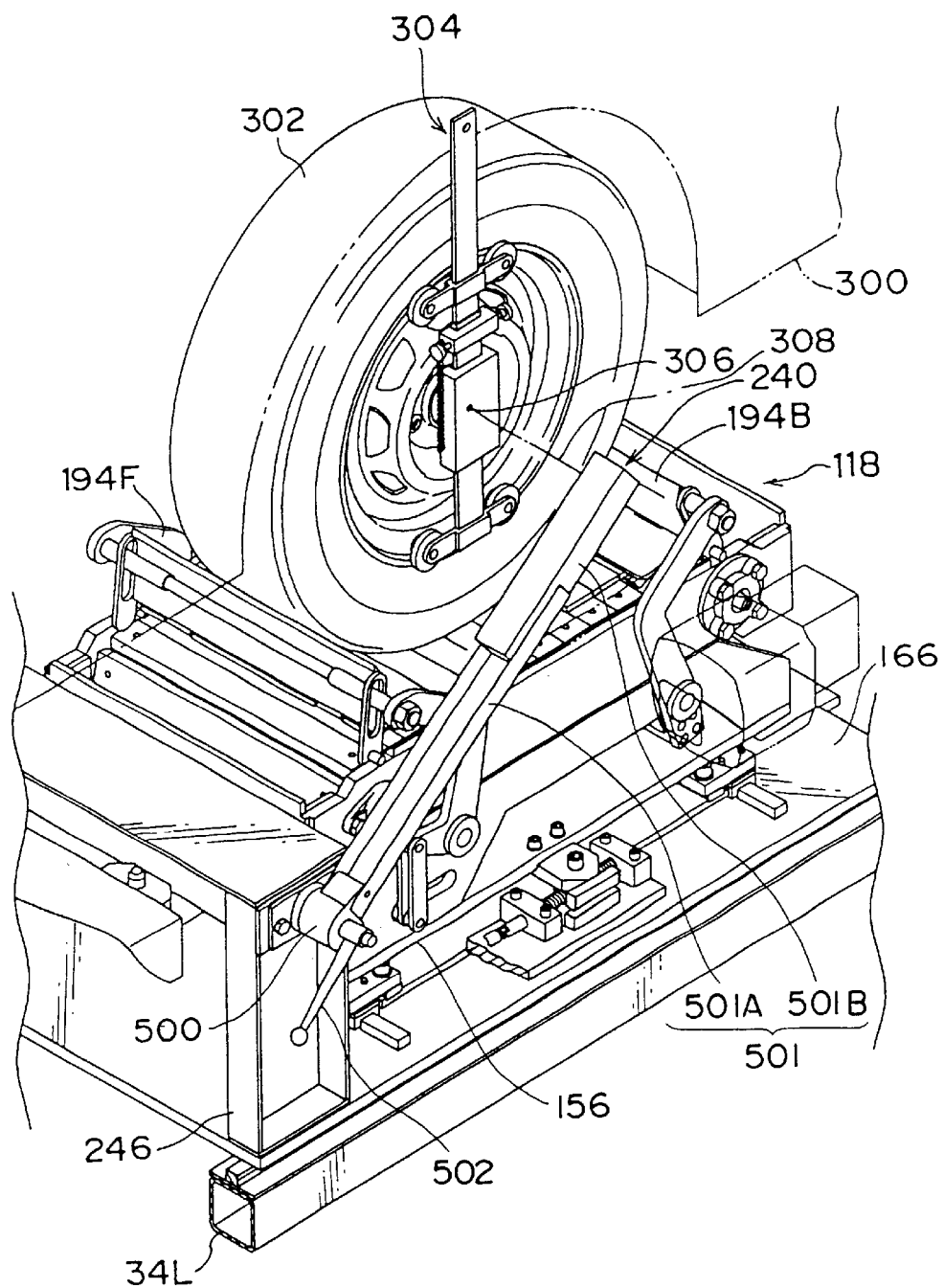
FIG. 14 is a perspective view of the tire driving device, and illustrates a state in which a wheel is fixed.

As illustrated in FIG. 14, a distance measuring device 240 is provided at each tire driving device 118.

The distance measuring device 240 includes a rod 501 which is freely extendible and contractible. The rod 501 is formed by a first case 501A which is elongated and has a substantially U-shaped cross-sectional configuration, and a second case 501B which is formed in an elongated, box-shaped configuration and is inserted in the first case 501A so as to be freely slidable therein.

The rod 501 is rotatably supported at a side portion of the supporting stand 246 which stands upright at the longitudinal direction moving base plate 166 of the tire driving device 118. The rod 501 includes a distance measuring means (not shown) which is for measuring the distance to an indication point 306 of a jig 304 which is mounted to the disc wheel of the wheel and indicates the rotational axial center of the wheel 302.

The distance measuring means is formed by a wire 308 and an encoder or the like. The wire 308 can be fed out from a hole formed in the side surface of the rod 501 in a vicinity of the distal end thereof. The encoder measures the fed-out amount of the wire 308. The encoder converts the fed-out amount of the wire 308 into an electric signal, and outputs the results of measurement to the control device 126.

Operation

Next, an example of a method of adjusting wheel alignment by using the above-described wheel alignment adjusting device 10 will be described.

(1) In the initial state of the wheel alignment adjusting device 10, as illustrated in FIG. 8, the loading stand 18 is lowered to the lowermost position, and the second sub-base 70 is disposed on the loading stand 18.

In this state, the pins 84 of the arrow B direction side movably supported tire driving devices 118 are inserted in the holes 80 of the plate members 82 provided at the end portions of the second transfer plates 78. The second transfer plates 78 connect the arrow F direction side tire driving devices 118 and the arrow B direction side tire driving devices 118. The upper surfaces of the second transfer plates 78 and the upper surfaces of the front and back tire driving devices 118 substantially coincide with one another.

The first transfer plates 68 are connected to the arrow B direction side end portion of the loading stand 18 and to the arrow B direction side tire driving devices 118. Thus, the top surfaces of the first transfer plates 68, the second transfer plates 78, and the front and back tire driving devices 118 substantially correspond to one another.

(2) An operator measures the wheel base and the front and rear tread bases of the vehicle 300 which is the object of adjustment. The operator changes the distance between the front and rear tire driving devices 118 in accordance with the wheel base, and changes the distance between the left and right tire driving devices 118 in accordance with the tread base.

The changing of the distance between the left and right tire driving devices 118 is carried out as follows.

(A) The solenoids 52 of the lock devices 50 are energized, the teeth 54 separate from the racks 48, and the first sub-base 34R is set in a movable state (unlocked state).

(B) The solenoid 46 is energized, and the wire rope 40 is grasped by the grasping claw 44.

(C) The handle 42 is rotated, the wire rope 40 is made to circulate, and the left/right positional adjustment of the first sub-base 34R is carried out in accordance with the tread base.

(D) The solenoid 46 is set in a non-energized state, and the grasping claw 44 releases the wire rope 40.

(E) The solenoids 52 of the lock devices 50 are set in a non-energized state, the teeth 54 engage with the racks 48, and the first sub-base 34R is locked at both the arrow F direction side end portion and the arrow B direction side end portion.

The changing of the distance between the left and right tire driving devices 118 is thus completed.

Here, in the wheel alignment adjusting device 10 of the present embodiment, either the left or the right tire driving devices 118 are fixed (the tire driving devices 118 provided at the first sub-base 34L are fixed), and the other tire driving devices 118 (those provided at the first sub-base 34R) are moved in the left and right directions. Thus, as compared with a case in which the tire driving devices 118 at both the left side and the right side are moved, the tire driving devices 118 can be positioned more accurately.

Further, the first sub-frame 34R is fixed to the main frame 19 (the racks 48) of the loading stand 18 by the lock devices 50 at both the arrow F direction side end portion and the arrow B direction side end portion of the first sub-base 34R. Thus, the positions of the tire driving devices 118 disposed on the first sub-base 34R do not move due to external force or the like.

Changing of the distance between the front and rear tire driving devices 118 is carried out as follows.

The motor unit 66 is driven such that the two arrow B direction side tire driving devices 118 are moved forward or backward. The distance between the arrow F direction side tire driving devices 118 and the arrow B direction side tire driving devices 118 is thus adjusted in accordance with the wheel base.

When the driving of the motor unit 66 is stopped, due to the action of the nuts and the feed screws, the tire driving devices 118 are locked so as to not move in the longitudinal direction.

(3) When the positions of the respective tire driving devices 118 have been determined in accordance with the tread base and the wheel base, next, the vehicle 300 is moved onto the loading stand 18 from the direction of arrow B side with the steering wheel of the vehicle 300 set at the position for the vehicle to move straight forward, such that the wheels 302 of the vehicle 300 are positioned on the tire driving surfaces 136 of the tire driving devices 118 and the center line of the vehicle body is substantially parallel to the circulating direction of the endless tracks 134 of the tire driving devices 118.

When the wheels 302 correspond to the tire driving surfaces 136 of the respective tire driving devices 118, the second transfer plates 78 of the second sub-base 70 are positioned beneath the vehicle.

(4) The rods 501 are manually rotated and extended or contracted such that the holes, from which the wires 308 of the rods 501 are fed out, oppose the centers of the wheels 302. Then, the wires 308 are drawn out, and the distal ends thereof are anchored to the indication points 306 of the jigs 304.

(5) When the above-described operations have been completed, the operator instructs the control device 126 that wheel-alignment measuring is to be carried out.

The control device 126 executes wheel alignment measurement processing, and periodically effects vehicle body orientation adjustment processing each time a predetermined period of time passes.

In the vehicle body orientation adjustment processing, by using the four distance measuring devices 240, the distance from the distance measuring device 240 to the center of the wheel 302 (the center of the jig) is measured for each of the wheels 302, and a determination is made as to whether the vehicle 300 is oriented correctly. If the vehicle 300 is not oriented correctly, the motor 182 is driven such that the tire driving devices 118 are moved in the circulating axial direction and the position is adjusted.

In the present embodiment, the two arrow F direction side tire driving devices 118 do not move, and the two arrow B direction side tire driving devices 118 are fixed by the left and right connecting device 310 so as to be unable to move relative to one another. Only the two arrow B direction side tire driving devices 118, which are fixed together, are moved in the circulating axial direction so that position adjustment is carried out.

Next, wheel alignment measurement processing will be described.

First, for the three wheels 302 other than the wheel 302 which is the object of measuring, the corresponding wheel stopping plates 194F, 194B are rotated such that the three wheels which are not the object of measuring are locked and are unable to move in the longitudinal direction of the vehicle. The tire driving device 118 corresponding to the tire 302 which is the object of measuring is driven and circulated.

In this way, the tire 302 which is the object of measuring is made to roll on the tire driving surface 136. The tire 302 which is the object of measuring repeats the actions of riding up from the top surfaces of the plate members 132 onto the top surface of the protruding portion, and coming down off from the top surface of the protruding portion onto the top surfaces of the plate members 132.

Due to this riding up onto the protruding portion and coming down off of the protruding portion, a longitudinal force Fx (circulating direction force), a lateral force Fy (circulating axial direction force) and a load Fz (force in the direction orthogonal to the tire driving surface) are generated at the wheel 302 which is the object of measurement. In the present embodiment, among these three forces, the longitudinal force Fx and the lateral force Fy are measured by the force sensors 152.

The control device 126 carries out the above-described measurement processing for all of the wheels 302, and on the basis of the results of measurement, computes a toe angle adjustment direction and adjustment amount for each of the wheels 302.

The toe angle adjustment direction and adjustment amount of each wheel 302 are displayed on the display device 126A. Thus, on the basis of the information displayed on the display device 126A, the operator can easily judge whether toe angle adjustment is required for the respective wheels, and if toe angle adjustment is required, what adjustment direction and how much of an adjustment would suffice.

In this way, regardless of the type of the tires mounted to the vehicle 300, the positional angle of each of the wheels of the vehicle 300 can be adjusted appropriately such that good traveling stability on actual road surfaces can be obtained in accordance with the characteristics of the tires and such that resistance to irregular wear can be improved.

The methods disclosed in, for example, Japanese Patent Application Laid-Open (JP-A) No. 10-7013 can be used for the wheel alignment measurement processing and the vehicle body orientation adjustment processing. However, other processings as well may of course be carried out.

(6) When the vehicle 300 is raised up in order to carry out adjustment of the vehicle 300 or the like, the motor unit 30 is driven.

When the motor unit 30 is driven and the chain 26 is driven in a predetermined direction, the sprockets 24 and the rotating members 22 of the respective supporting pillars 14 are rotated simultaneously.

Figure 16:
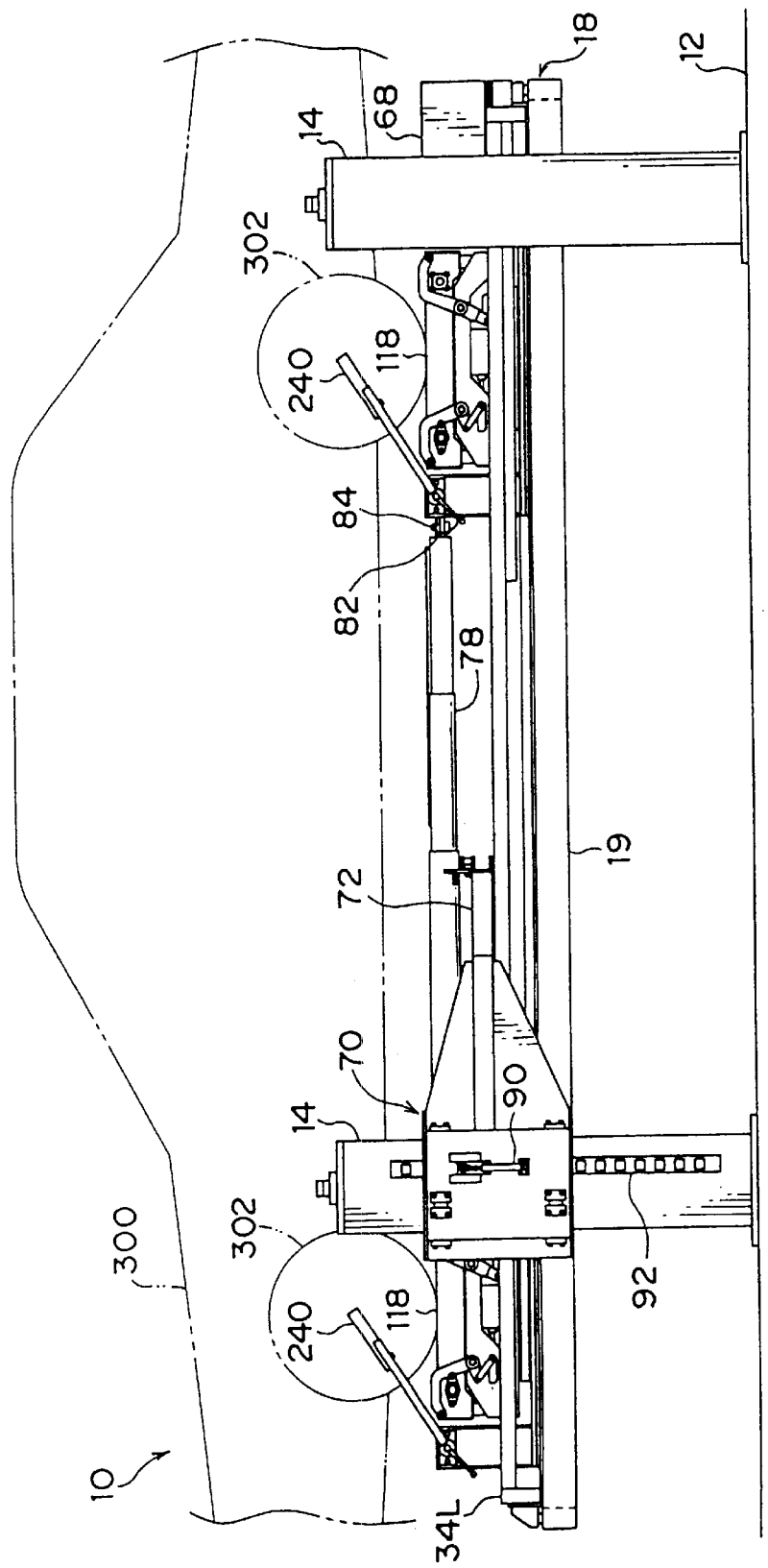
FIG. 16 is a side view, as seen from the left side of the wheel alignment adjusting device, illustrating a state in which a vehicle body has been raised up.

The loading stand 18 and the second sub-base 70 loaded on the loading stand 18 are integrally raised along the vertical feed screws 16. In this way, as illustrated in FIG. 16, a work space for a worker is formed beneath the loading stand 18.

(7) When the tires of the vehicle are to be changed, processes are carried out as follows.

(A) After the loading stand 18 and the second sub-base 70 are raised as described above, the loading stand 18 is lowered with the second sub-base 70 locked to the supporting pillars 14 by the lock devices 90 (see FIG. 1).

Usually, the air cylinders 102 urge the lock levers 96, by air pressure, in the directions in which the lower ends 96A of the lock levers 96 contact the lock plates 92. Thus, when the loading stand 18 is lowered, the lower ends 96A of the lock levers 96 enter into the square holes 94 and catch on the lower ends 94A (the state in FIG. 10). The lowering of the second sub-base 70 is stopped, and only the loading stand 18 is lowered.

If the lower ends 96A are inserted into the square holes 94, the lower ends 96A catch on the lower ends of the square holes 94. If the lower ends 96A of the lock levers 96 are not in the square holes 94, after the lower ends 96A are inserted into the square holes 94 therebeneath, the lower ends 96A catch on the lower ends of these square holes 94, and the lowering of the second sub-base 70 is thereby prevented.

(B) When driving of the motor unit 30 is continued, only the loading stand 18 is lowered. The lower surface of the vehicle body of the vehicle 300 abuts the upper surfaces of the second transfer plates 78 of the second sub-base 70, and the vehicle 300 is supported in a state of being disposed on the second sub-base 70. As is shown by the imaginary lines in FIG. 1, the tire driving devices 118 are separated from the wheels 302, and the tires can be changed in this state.

In this way, in the wheel alignment adjusting device 10 of the present embodiment, as described above, the second sub-base 70 is locked and only the loading stand 18 is lowered. Thus, the state can be changed from the state in which the second transfer plates 78 are loaded on the loading stand 18 to the state in which the second transfer plates 78 are separated from the loading stand 18. Therefore, when the tires are being changed, there is no need for a separate jack or a separate rigid rack, and changing of tires can be carried out easily.

After the tires have been changed, if alignment adjustment of the vehicle 300 is to be carried out or the vehicle 300 is to be taken off of the device, the loading stand 18 is raised and the second sub-base 70 is raised up slightly (by an amount that enables the lower ends 96A of the lock levers 96 to separate upward from the lower ends of the square holes 94). The air cylinders 102 are operated, and the lower ends 96A of the lock levers 96 move apart from the lock plates 92. In this way, the wheels of the vehicle 300 are loaded on the tire driving devices 118, and the vehicle body moves apart from the second sub-base 70.

Then, when the loading stand 18 is lowered with the lower ends 96A of the lock levers 96 separated from the lock plates 92, the second sub-base 70 is lowered together with the loading stand 18 while being disposed on the top surface of the loading stand 18.

After lowering has been completed, the air cylinders 102 are operated such that the lock levers 96 are urged in the directions in which the lower ends 96A of the lock levers 96 contact the lock plates 92.

Another Embodiment

In the wheel alignment adjusting device 10 of the above-described embodiment, upward and downward movement of the loading stand 18 connected to the rotating members 22 is carried out by rotating the rotating members 22 which are screwed with the vertical feed screws 16 fixed to the supporting pillars 14. However, the present invention is not limited to the same. The rotating members 22 may be fixed to the loading stand 18 and motors may be provided at the supporting pillars 14, such that the loading stand 18 can be moved upward and downward by the vertical feed screws 16 being rotated by the motors disposed at the supporting pillars 14. Or, the loading stand 18 may of course be moved upward and downward by oil pressure cylinders or the like, without using screw mechanisms.

As described above, in accordance with the wheel alignment adjusting device of the first aspect, the loading portions, on which the wheels of a vehicle are loaded, can be accurately positioned. Thus, wheel alignment adjustment can be carried out precisely and with high accuracy.

In accordance with the wheel alignment adjusting device of the second aspect, accuracy of positioning can be improved as compared with a case in which the loading portions for the front wheels and the loading portions for the rear wheels are moved independently. Thus, wheel alignment adjustment can be carried out precisely and with high accuracy.

In accordance with the wheel alignment adjusting device of the third aspect, shifting of the position of the sub-base due to external force or the like can be prevented. Thus, wheel alignment adjustment can always be carried out precisely and with high accuracy.

In accordance with the wheel alignment adjusting device of the fourth aspect, each of the vehicle longitudinal direction sides of the sub-base are fixed to the loading stand by a fixing means. Thus, wheel alignment adjustment can be carried out more precisely and with higher accuracy than in a case in which the sub-base is fixed at one position.

What is claimed is:

1. A wheel alignment adjusting device comprising;

a loading stand provided with a plurality of loading portions on which wheels of a vehicle are loaded, and two fixing devices for fixing a sub-base to the loading stand;

wherein loading portions at one vehicle transverse direction side are fixed to the loading stand so as to be immovable along a vehicle transverse direction with respect to the loading stand, loading portions at another vehicle transverse direction side are supported so as to be movable along a vehicle transverse direction with respect to the loading stand; and the loading portions at another vehicle transverse direction are mounted to the sub-base, which is supported so as to be movable along the vehicle transverse direction with respect to the loading stand, wherein the fixing devices are provided at respective substantially distal ends in the longitudinal direction of the sub-base.

2. A wheel alignment adjusting device according to claim 1, wherein at least one of the fixing devices is formed by:

a rack provided at the loading stand;

a tooth member provided at the sub-base and engageable with the rack; and a driving member which drives the tooth member in a direction in which the tooth member engages with the rack and in a direction in which engagement of the tooth member with the rack is released.

3. A wheel alignment adjusting device according to claim 2, wherein the fixing device is provided at each of vehicle longitudinal direction sides of the sub-base, and a vehicle front direction side driving member and a vehicle rear direction side driving member are controlled such that a vehicle front direction side tooth member and a vehicle rear direction side tooth member simultaneously engage with a vehicle front direction side rack and a vehicle rear direction side rack.

4. A wheel alignment adjusting device according to claim 2, wherein the driving member is a solenoid.

5. A wheel alignment adjusting device according to claim 1, wherein the loading portions at the one vehicle transverse direction side are for supporting a pair of wheels comprising a front wheel and a rear wheel of the vehicle at the one vehicle transverse direction side, and the loading portions at the other vehicle transverse direction side are for supporting a pair of wheels comprising a front wheel and a rear wheel of the vehicle at the other vehicle transverse direction side.

* * * * *